United States Patent
Glinsky

(10) Patent No.: US 7,181,379 B2
(45) Date of Patent: Feb. 20, 2007

(54) VARIABLE ALTITUDE SIMULATOR SYSTEM FOR TESTING ENGINES AND VEHICLES

(75) Inventor: Gerard Glinsky, Aurora, CO (US)

(73) Assignee: Environmental Testing Corporation, Aurora, CO (US)

( * ) Notice: Subject to any disclaimer, the term of this patent is extended or adjusted under 35 U.S.C. 154(b) by 605 days.

(21) Appl. No.: 10/389,870

(22) Filed: Mar. 17, 2003

(65) Prior Publication Data

US 2004/0186699 A1    Sep. 23, 2004

(51) Int. Cl.
*G06G 7/48* (2006.01)

(52) U.S. Cl. .................. 703/8; 73/35.02; 73/35.03; 73/116; 73/117.1

(58) Field of Classification Search ........... 536/23.1; 348/148; 340/539.1, 425.5; 429/20; 165/58; 62/268; 454/76
See application file for complete search history.

(56) References Cited

U.S. PATENT DOCUMENTS

| | | | |
|---|---|---|---|
| 3,938,377 A | | 2/1976 | Converse, III et al. |
| 4,964,318 A | * | 10/1990 | Ganoung ..................... 477/110 |
| 5,529,048 A | * | 6/1996 | Kurihara et al. ............. 123/685 |
| 5,753,185 A | | 5/1998 | Mathews et al. |
| 6,023,890 A | * | 2/2000 | Zenobi ........................... 52/64 |
| 6,044,696 A | * | 4/2000 | Spencer-Smith .............. 73/117 |
| 6,554,088 B2 | * | 4/2003 | Severinsky et al. ........ 180/65.2 |
| 6,561,014 B1 | * | 5/2003 | Smith et al. ................. 73/117.1 |
| 6,690,174 B2 | * | 2/2004 | Sigwart et al. .............. 324/511 |
| 2002/0088271 A1 | * | 7/2002 | Sigwart et al. ............. 73/118.1 |
| 2002/0114985 A1 | * | 8/2002 | Shkolnik et al. .............. 429/20 |
| 2003/0084712 A1 | * | 5/2003 | Smith et al. ................. 73/118.1 |
| 2003/0182944 A1 | * | 10/2003 | Hoffman et al. ............... 60/772 |
| 2004/0134457 A1 | * | 7/2004 | Evans ....................... 123/193.4 |
| 2004/0216535 A1 | * | 11/2004 | Brostmeyer et al. ........ 73/865.6 |
| 2005/0076665 A1 | * | 4/2005 | Pruitt ........................... 62/310 |
| 2005/0166890 A1 | * | 8/2005 | Wickman et al. ............ 123/276 |
| 2006/0000457 A1 | * | 1/2006 | Huang .................... 123/568.14 |

OTHER PUBLICATIONS

Engine Dynamometer Testing☐☐www.aei-tech.com/edt.htm☐☐2002 Analytical Engineering, Inc.*

* cited by examiner

*Primary Examiner*—Kamini Shah
*Assistant Examiner*—Cuong Van Luu
(74) *Attorney, Agent, or Firm*—Stites & Harbison, PLLC; John E. Vanderburgh

(57) ABSTRACT

A method and system for controlling both the pressure and temperature at the engine air intake, engine crankcase, and at the engine exhaust so that pressure and temperature conditions are equilibrated. Engines are tested both at simulated high altitudes (operating air at barometric pressures lower than the local barometric pressure at the test site) and low altitudes (operating air at barometric pressure higher than the local barometer at the test site) and at a variety of operating air temperatures. The method and system provide for the balancing of air pressure at the engine air intake and crankcase and engine exhaust. The effect of unbalanced air pressure is on engine emission test results is demonstrated.

15 Claims, 4 Drawing Sheets

VARIABLE ALTITUDE SIMULATOR SYSTEM FOR TESTING ENGINES AND VEHICLES

FIELD OF THE INVENTION

This invention relates to a method and system for testing internal combustion engines and motor vehicles, by employing laboratory equipment capable of simulating variable altitude and air temperature conditions.

BACKGROUND OF THE INVENTION

Engine performance, be it diesel or gasoline fueled engines, is greatly affected by variations in altitude at which the engine is operated. Such variations of altitude can affect performance to the point that an engine or vehicle tested may not function properly or may have a lower power rating when used in high-altitude applications. Moreover, manufacturers conduct certification testing in the laboratory to comply with the Environmental Protection Agency's on-highway standards for regulated exhaust emissions and smoke, but the emissions can change significantly under different barometric pressures and ambient air temperatures. In recognition of the potential impacts on air pollution, the Environmental Protection Agency and State of California Air Resources Board have adopted "not-to-exceed" regulations that require manufacturers to also certify engine and vehicle emissions for a range of altitudes and ambient air temperatures, via stationary or mobile laboratory testing There are several ways in which to simulate variable altitudes in the engine or vehicle laboratory. In one common method, higher altitudes are simulated by restricting airflow to the engine intake. However, this approach yields faulty results since the exhaust of the engine is not similarly adjusted for high altitude conditions. Therefore, the engine gas exchange process and turbocharger gas flow (if equipped) are not correct for the altitude being simulated, and this will significantly effect the performance, fuel consumption and exhaust emissions from the engine. A similar problem exists for engines that are produced at higher altitudes and which must be tested for operation at lower altitudes such as sea level. Since most major engine manufacturers employ certification laboratories that are located at relatively low altitudes, that is less than 2,000 feet above sea level, there is a need to test engines and vehicles at higher altitudes to investigate the impact of altitude on performance and emissions. In most cases, the manufacturer mounts the engine in a vehicle which can then be transported to higher altitudes where the engine is again set up and tested at the high altitude. This results in needless expense to the manufacturer and the ultimate customer, as the altitude conditions can be realistically simulated in the stationary engine and vehicle laboratories. Note however that previous attempts to test engines and vehicles at simulated high altitudes by restricting the flow of air to the engine intake have provided inconsistent results due, in large measure, to the fact the intake and exhaust pressures are not equalized.

SUMMARY OF THE INVENTION

To properly set up and test an engine, the pressures at the engine air intake, engine crankcase and engine exhaust should be equalized at the simulated barometric pressure, to achieve accurate and reliable results. At the manufacturing facilities this is normally not a problem as the engines are tested at ambient barometric pressure. To set up and test the engines at higher altitudes, the engines are normally mounted in vehicles that are transported higher altitudes at which the engine is to be tested. Similarly, prior to the present invention, no practical way for testing engines at lower elevations and higher pressures was available except for installing the engine in a vehicle and transporting it to a test site at a location below the elevation at which the engine was manufactured and originally tested.

In accordance with the invention, there is provided a method and system for controlling both the pressure and temperature at the engine air intake, engine crankcase, and at the engine exhaust so that pressure and temperature conditions are equilibrated. The present invention allows for the testing of engines both at high altitudes (simulated barometric pressures lower than the local barometric pressure at the test site) and low altitudes (simulated barometric pressure higher than the local barometric pressure at the test site) and at a variety of air temperatures. Air temperature control is important to meet test procedure requirements defined in the Code of Federal Regulations. The present invention can be employed for quality control of engines on a production line prior to installation in a vehicle, for use in engine performance, development and emissions labs, and for testing of engines mounted in vehicles. The simulated altitudes can be conveniently changed so that, in a single setup, an engine can be tested for its operation and emissions at the local altitude, at low altitudes and at high altitudes in a single setup. In this fashion, the manufacturer can be assured that the engines will meet quality standards for both engine operations and emissions at a variety of altitudes prior to mounting the engines in a vehicle. Vehicles can also be tested at a variety of altitudes and temperatures to insure that it complies with emission standards over a range of altitudes and air temperatures.

In accordance with the method of the present invention ambient air is drawn through a motor driven supercharger to a pressure tight plenum. The pressure in the plenum is maintained and adjusted by controlling the output from the supercharger. Air at the desired pressure to represent a selected altitude is distributed from the plenum to an engine crankcase and engine air intake. Additionally air is directed to an exhaust dilution tunnel that is in communication with the engine exhaust. In this manner the air intake, engine crankcase, and exhaust pressures are equilibrated. Pressure in the plenum is controlled and adjusted by controlling the output from the supercharger.

The system of the present invention comprises a pressure control module which is in fluid communication with a pressure-temperature equalization module. The pressure control module comprises a motor driven supercharger and a motor controller for controlling the output of the supercharger by controlling the motor speed. The supercharger may be any type of air compressor, including a positive displacement pump, Roots-type blower, centrifugal fan, screw or reciprocating compressor. The supercharger is in fluid communication with the pressure-temperature equalization module for delivery of air at the desired pressure to that module.

The pressure-temperature equalization module comprises a pressure tight plenum that includes a water-cooled heat exchanger for controlling the temperature of the air in the plenum. The plenum is in fluid communication with the engine air intake and engine crankcase and also with an exhaust dilution tunnel into which the engine exhaust is discharged so that air pressure is equivalent at both the engine intake and engine exhaust.

The system further includes a motor controller that is connected to a pressure transducer on the plenum of the pressure-temperature equalization module for control of the speed of the motor and resultant pressure of air output from the supercharger responsive to the signal from the transducer. An air temperature controller is provided to receive a signal from a thermal measuring device in an air output duct for controlling the flow of cooling water through the heat exchanger dependant upon the desired air temperature.

In one embodiment of the invention, the pressure control module is mounted on a cart that is provided with wheels for ease in moving the module. Likewise, the pressure-temperature equalization module is provided with wheels. In this manner the entire system is relatively portable and easily moved into position for engine testing.

DESCRIPTION OF THE PREFERRED EMBODIMENTS

Figure 1:
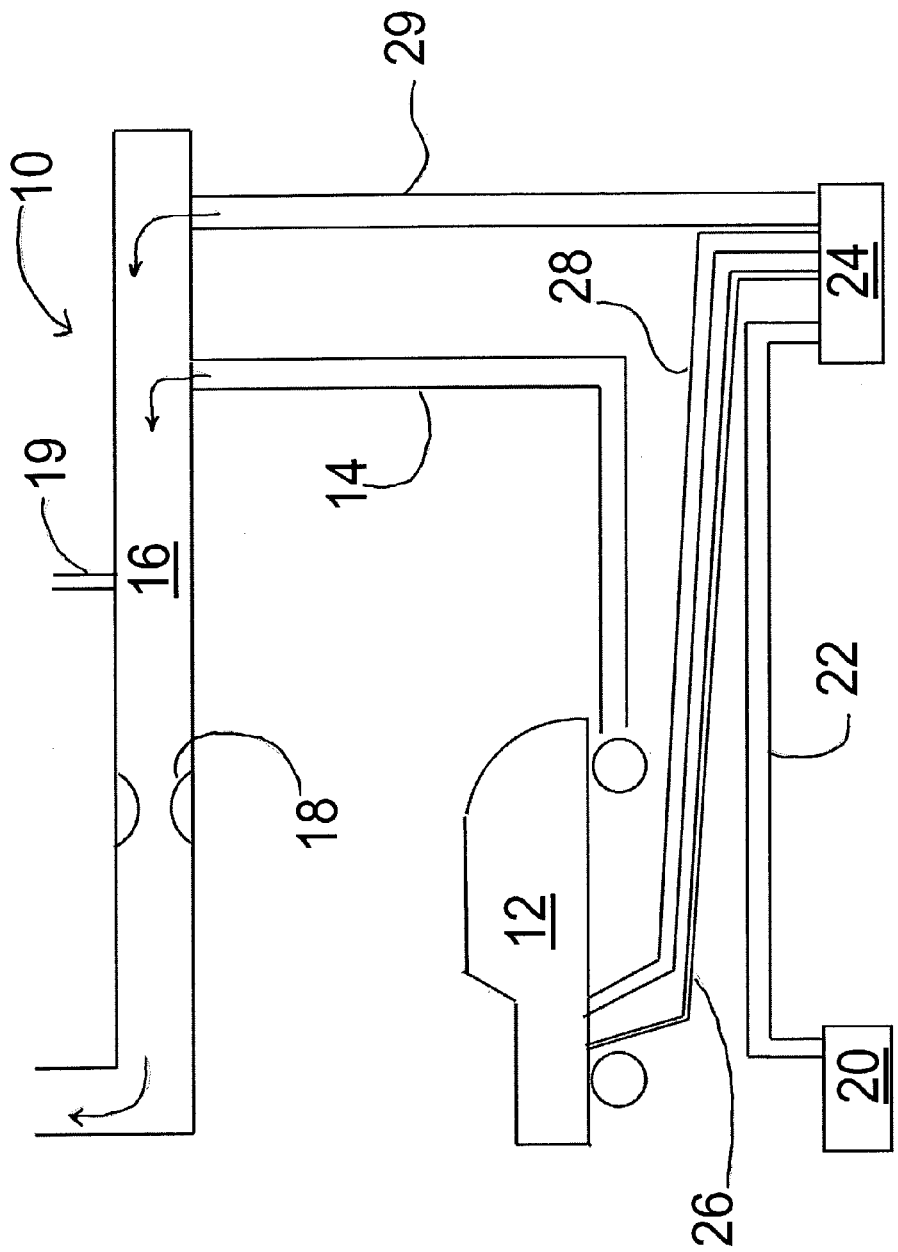
FIG. 1 is a schematic drawing of the entire system as utilized for testing the engine of a vehicle.

As used herein the term "engine" refers to gasoline fueled and diesel fueled engines whether standing alone or installed in a vehicle.

The term "test" or "testing" refers to the determination of engine performance including power, torque, fuel consumption and other operational parameters, regulated and non-regulated pollutants in engine exhaust emissions, and to the testing of operational parameters such as, for example, possible malfunctions of the engine which can only be determined after the engine is fully assembled and running under load. Such parameters would include, for example, exhaust valve leaks or turbocharger stall or surge which can result in emissions in excess of the not to exceed (NTE) emission regulated values. Engine fuel systems, ignition systems, catalysts, and fuel formulations are also tested for emissions to determine compliance with EPA and state emissions regulations.

As used herein the terms "equilibrated" and "balanced" when referring to a selected air pressure are used interchangeably to mean that intake air pressure and exhaust pressure are substantially equal and can be said, in essence, to be in equilibrium in creating the conditions an engine would be exposed to when operating at the simulated altitude represented by the selected air pressure.

In accordance with the invention, a method and system are provided for the testing of engines and vehicles at various altitudes by the introduction of air at a desired pressure to simulate a selected altitude at the intake and exhaust portions of an engine, and within its crankcase. In this fashion, the pressure at both the intake and exhaust is equilibrated to provide more accurate test results of the engine at the selected pressure. It will be understood that because of slight pressure pulsations in the flow of compressible gases exact pressure balance (or equilibration) is extremely difficult to achieve. For purposes of the present invention pressure balance or equilibration is achieved when the difference between intake pressure and exhaust pressure is about 10 mmHg or less. In many cases pressure balance is within 6 mmHg.

Pressure is selected to simulate the barometric pressure at a desired altitude. Thus, an engine can be tested at altitudes ranging from high altitude, i.e. above 4,000 feet, and low altitude, less than 4,000 feet. In accordance with the invention, the simulated altitude at which the engine is tested can be easily changed so that an engine can be tested over a wide range of altitudes in a single set up.

The Environmental Protection Agency has promulgated regulations for altitude performance adjustments for new and in-use motor vehicles and engines that requires the manufacturer to submit to the EPA for approval altitude performance adjustment instructions for both low altitude and high altitude operation. The ability to readily test newly assembled engines and to audit in-use engines at varying altitude and temperature conditions provides evidence that the engines will meet emission standards in accordance with the adjustment instructions for that engine.

Referring to FIG. 1 there is illustrated in simplified form the system of the present invention, illustrated generally as 10, in combination with an emission testing system to which a vehicle 12 has been connected for testing. As mentioned above, it is the engine operation and emissions that are being tested and for convenience all references to engine will include engines standing alone or installed in a vehicle. The engine exhaust is connected by an exhaust tube 14 to the emission testing system that includes an exhaust dilution tunnel 16 that is provided with a venturi 18. The exhaust dilution tunnel is of conventional design and is of the type ordinarily utilized in testing auto emissions. The exhaust dilution tunnel 16 provides for the dilution of engine exhaust with fresh air that is introduced upstream of the introduction point of the exhaust and its function and operation are well understood in the art. A sampling line 19 is provided upstream of the venturi 18 for drawing diluted emission samples for testing. Blowers (not shown) downstream of the venturi 18 draw the diluted exhaust flow through the tunnel and vent it to the atmosphere. The blowers are of sufficient size to insure that the exhaust gases do not backflow within the system 10 and the blower fans may be used in two stages to achieve the greatest reduced pressure in the system and ensure the proper flow of air and emissions through the system 10.

The system 10 comprises a pressure control module 20 that is in fluid communication by means of a crossover duct 22 with a pressure-temperature equalization module 24. The pressure-temperature equalization module 24 is in fluid communication with the engine crankcase through a line 26 and with the engine air intake by means of an intake duct 28. The module 24 is also in fluid communication with the exhaust dilution tunnel 16 by means of a duct 29.

Figure 2:
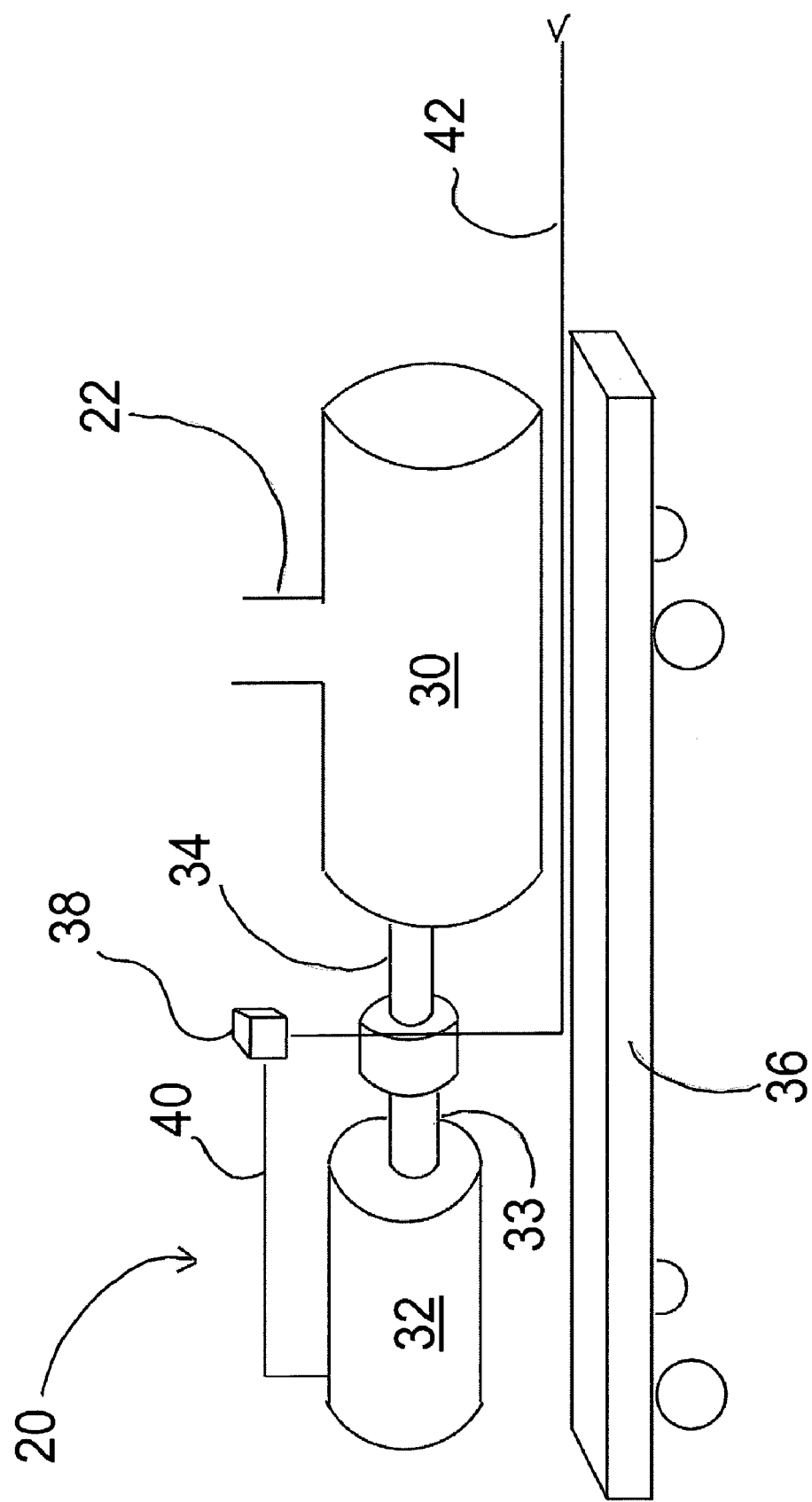
FIG. 2 is a schematic representation of the pressure control module of the system of FIG. 1.

Referring to FIG. 2, the pressure control module 20 includes a supercharger 30 and an electric motor 32 that drives the supercharger by a driveshaft 33. Module 20 may be mounted on a suitable cart 36 provided with wheels for conveniently moving the module 20.

The supercharger 30 may any type of air compressor, including a positive displacement pump, roots-type blower, centrifugal fan, screw, scroll or reciprocating compressor. The supercharger 30 is preferably a positive displacement type supercharger such as, for example, a vane type or a Roots type supercharger. For example, The Roots supercharger is a high flow capacity, positive displacement pump that provides good air delivery characteristics over a wide range of airflow and pressure ratios. The Roots type of design is exceptionally responsive to controlling airflow and pressure and, as it has a direct mechanical connection to the drive shaft 33 of the motor 32 through a drive spindle 34, there is essentially no lag due to spool up or spool down.

Other types of superchargers, such as fan type or centrifugal superchargers, can be used with good results. Centrifugal compressors are advantageous for some applications due to their low noise and vibration.

For lower altitudes and higher barometric pressure, the supercharger compresses air and delivers this compressed air through the crossover duct 22 to the pressure-temperature equalization module 24. For higher altitudes and lower barometric pressure, the supercharger turns in the same direction to supply air through the crossover duct 22 but in this case the motor essentially serves as a brake and the supercharger restricts the flow of air demanded by the engine 12 and the exhaust dilution tunnel 16. In this manner, the airflow to the pressure-temperature equalization module 24 is at a selected pressure below ambient. Thus, by controlling the speed of the motor 32 (as defined by its rpm) the supercharger 30 can be operated to provide high pressure air to the pressure-temperature equalization module 24 for simulated low altitude, or at low speed to restrict the air flow to lower the pressure in the module 24. The motor 32 preferably operates on alternating current and is controlled by a motor control system consisting of a vector line controller 38 that is in electrical communication with the motor 32 by a line 40 and with a pressure sensing device at the pressure-temperature equalization module 24 by a line 42. The desired pressure for the selected simulated altitude produced by the supercharger 30 is directly related to engine rpm. The pressure feedback signal from the pressure sensing device 64 is compared with a user-specified set point for the simulated barometric pressure, and adjusts the motor speed 32 to minimize the difference between specified and actual pressure. The pressure can also be set manually, by adjusting the controller 38 until the proper pressure is achieved. The control system then adjusts the speed of the motor 32 and the resultant compression of air by the supercharger 30 to maintain the correct air pressure in the pressure-temperature equalization module 24 by signals received from a pressure monitoring device at the pressure-temperature equalization module through the line 42 to the controller 38.

Figure 3:
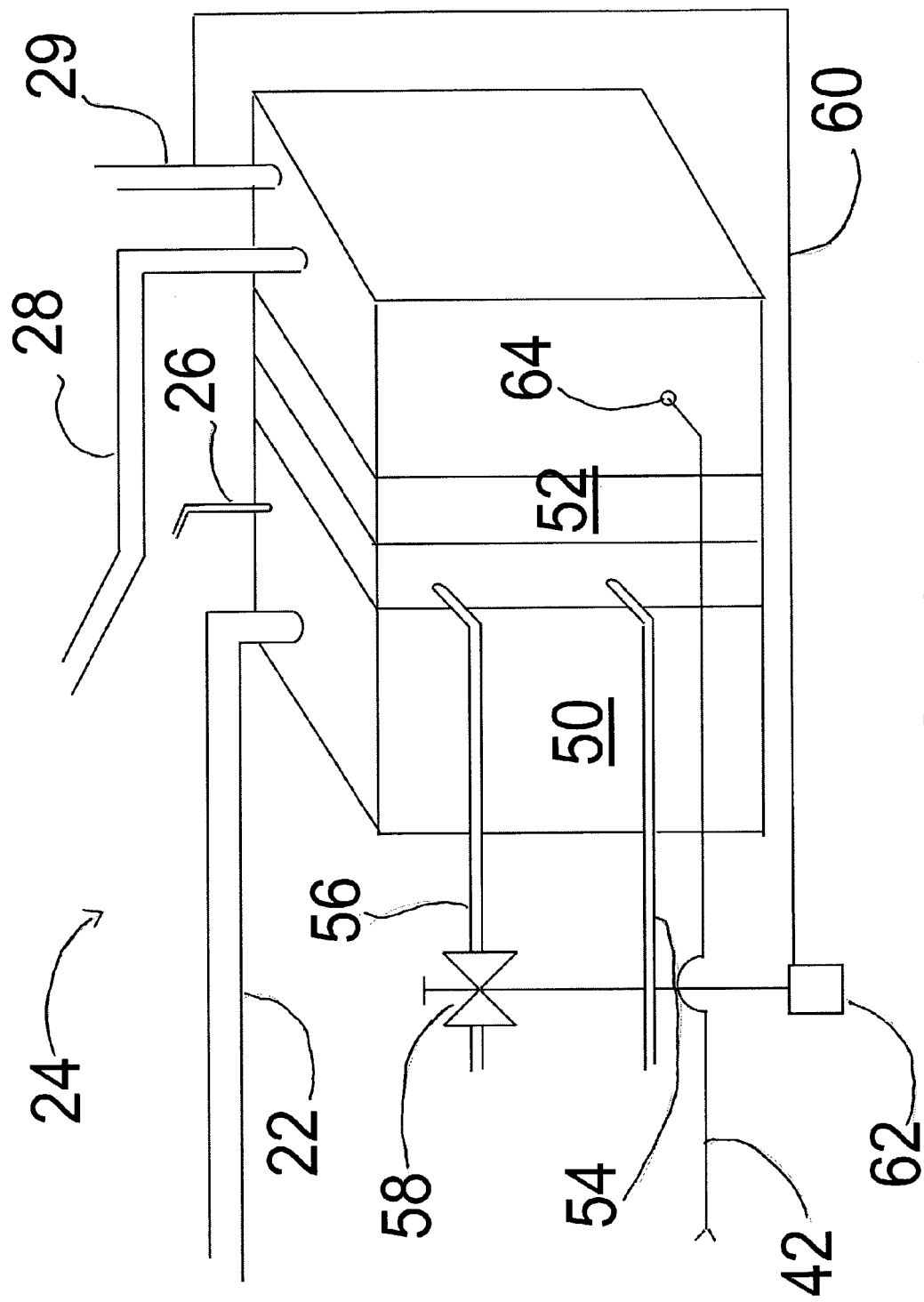
FIG. 3 is a schematic representation of the pressure-temperature equalization module of FIG. 1.

Referring to FIG. 3, the pressure-temperature equalization module 24 comprises a pressure tight plenum 50 for receiving the air from the supercharger 30 through the crossover duct 22. The plenum 50 serves to minimize pressure fluctuations due to transient engine or vehicle operation as well as to provide air at a selected pressure to both the air intake and crankcase of the engine and to the exhaust dilution tunnel 16 of the emission test system. Thus, air at a desired pressure is balanced at both the intake and exhaust of an engine under test and the conditions for the engine are as though it were operating at a selected altitude as represented by the pressure of the delivered air.

The process of compressing air by the supercharger 30 normally results in heating the air so that the air will require cooling prior to transfer to the engine intake and exhaust dilution tunnel 16. The pressure tight plenum 50 includes a water cooled heat exchanger 52 for cooling the incoming air as necessary. The pressure tight plenum 50 has internal features to direct the incoming heated air to a water cooled heat exchanger 52. A water-inlet line 54 and outlet line 56 circulate cooling water through the heat exchanger 52. A pneumatically-activated valve 58 is disposed in the outlet line 56. As illustrated, the heat exchanger 52 consists of two copper tube and fin coil units and the air flows through both units in series. The units are internally plumbed so that the cooling water flows in parallel through both of the units. It will be understood, however, that depending on the coolant used and other factors such as the amount of selected pressure required to achieve the desired simulated altitude, a single tube and fin unit may be sufficient or three or more heat exchange units may be plumbed together. The air temperature is controlled by a thermocouple located in an outlet of the pressure tight plenum 50 which sends a feedback signal through a line 60 to a controller 62 which pneumatically operates the valve 58 to open or close it depending on whether there is a need for more or less air cooling. Valves, not shown, may be located in the line 26, duct 28 and duct 29 for shutting off the flow of compressed air when the system is not in operation.

A pressure transducer 64 communicates with the interior of the pressure-tight plenum 50 and sends a signal through the line 42 to the vector line controller 38 to control the speed of the motor 32 and consequently the air output from the supercharger 30. In addition to supplying air at an equivalent desired temperature and desired pressure to simulate a selected altitude to both the engine air intake and exhaust, the pressure-tight plenum 50 has a large internal volume and also acts to minimize pressure fluctuations due to transient engine operation. After flowing through the heat exchanger 52, the compressed air exits the plenum through the duct 29 to the exhaust dilution tunnel 16 and the duct 28 to the air intake of the engine 12 and the line 26 to the crankcase of the engine.

In another aspect of the invention, the pressure-temperature equalization module 24 can be mounted on wheels to make it convenient to move the module. For this reason, the water inlet line 54 and outlet line 56 may be flexible hoses that are attached to the heat exchanger 52 by quick couplings. Likewise the crossover duct 22, the line 26 to the engine crankcase, the air intake duct 28 and the duct 29 to the exhaust emission tunnel 16 are provided for quick coupling.

As mentioned, the system of the present invention is used to test engines for emissions and other quality control tests such as for example, fuel consumption, injection or ignition timing, and other parameters that can only be determined by running the engine. Although engine manufacturers as a matter of practice test green engines under load before they are sent to vehicle assembly, some of the impacts that altitude and air temperature have on engine performance and emissions may not be detected when the engine is tested at the manufacturer's laboratory.

The method of the present invention utilizing the system described above is particularly well suited for testing engines at simulated altitudes as well as engines already installed in a vehicle, and may help the manufacturer develop electronic control systems that will improve engine performance and emissions over a wide altitude and air temperature range.

Figure 4:
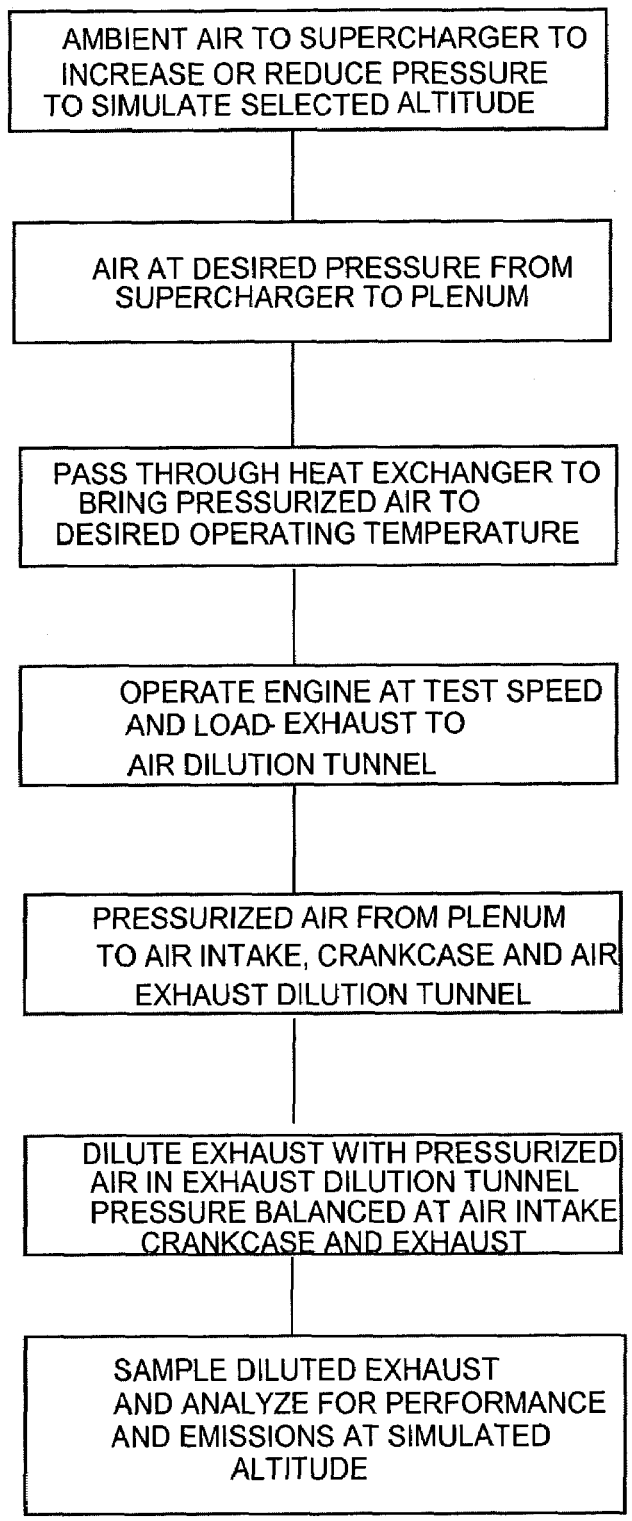
FIG. 4 is a flow diagram illustrating the method of the invention.

Thus, accordance with the method of the invention, as summarized in FIG. 4, an engine to be tested is placed in fluid communication with the pressure-temperature equalization module 24 through connection of the line 26 to the engine crankcase and the air intake duct 28 to the air intake of the engine. The exhaust duct 14 is connected to the tailpipe of the engine and leads to the exhaust dilution tunnel 16. Ambient air is drawn into the supercharger 30 by operation of the motor 32 and the speed of the motor is adjusted by the controller 38 to rotate the supercharger 30 at a sufficient rate to produce air at a pressure to provide the barometric pressure of a simulated altitude. The air from the supercharger 30 is transferred by the crossover duct 22 to the pressure-temperature controller module 24. The engine 12 is operated as well as the blowers in the exhaust dilution tunnel 16. Low altitude, high pressure is simulated by speeding up the revolutions of the motor 32 and resultant revolutions of the supercharger 30 to produce higher pressure air in the pressure-temperature equalization module 24. During production of high-pressure air, heat is generated and the air is cooled by the heat transfer unit 52. The system permits the engine to be operated at a variety of air temperatures as well as different air pressures and the desired air temperature can be set by the controller 62 which operates the pneumatically actuated valve 58 to introduce more or less cooling water to the heat exchanger 52 depending upon the desired temperature.

Operation of the engine 12 and the blowers in the exhaust dilution tunnel 16 serve to draw the pressurized air from the pressure-temperature controller module 24 through the line 26 and the air intake duct 28 to the engine and the duct 29 to the exhaust dilution tunnel. The air to the exhaust dilution tunnel 16 enters upstream of the point where the exhaust line 14 enters the tunnel.

To simulate low altitude, the controller 38 in the pressure control module 20 is set to select the desired speed of the motor 32 to operate the supercharger 30 to compress air to the desired pressure. The pressure transducer 64 monitors the air pressure within the pressure-tight plenum 50 of the pressure-temperature equalization module 24 and feeds a signal through the line 42 back to the controller 38 which in turn sends a signal through the line 40 to the motor to adjust the speed as necessary to maintain the pressure to simulate the selected altitude. For high altitude simulation lower pressure is required, normally below the ambient pressure of the test site. In this case, the controller 38 acts to slow the motor 32 and thus slow the supercharger 30 to restrict the flow of air to the pressure-temperature equalization module 24. The operation of the engine 12 and the blowers of the exhaust dilution tunnel 16 call for more air than is available in the plenum 50 thus producing reduced pressure in the line 26, air intake duct 28 and duct 29. Likewise, the air within the pressurized plenum 50 of the pressure-temperature equalization module 24 is at reduced pressure due to the restricted flow through the supercharger 30. In this fashion, the air reaching the engine 12 and the exhaust dilution tunnel 16 is at a pressure below ambient.

EXAMPLE 1

To study the effects of altitude on engine fuel consumption and regulated emissions, the variable altitude simulator system described above in connection with FIGS. 1–3 was used to simulate altitudes ranging from sea level to 12000 feet. Barometric pressures of 760 mmHg, 620 mmHg and 543 mmHg were selected as being the nominal barometric pressure at sea level, 5500 feet and 9000 feet respectively. Intake air temperature was maintained at 85° F.

The engine tested was a 1999 Daewoo off road turbo charged diesel having a displacement of 8.1 liters and a power rating 205 HP at 2200 RPM. The engine developed peak torque of 580 lb-ft at 1300 RPM. The fuel had a cetane number of 43 (as determined in accordance with ASTM D613), a sulfur content of 71 ppm (ASTM D5453) and a total aromatic content of 22.5% (ASTM D1319). In the tests reported herein the engine developed 555 lb-ft of torque at 1900 RPM.

Samples were taken by continuous volume sampling and analysis was carried out using an emissions testing bench manufactured and distributed by California Analytical Instruments, Inc., Orange, Calif. The sampled diluted exhaust was tested for brake specific fuel consumption (BSFC), NOx, total hydrocarbons (THC) and carbon monoxide (CO).

The results are graphically shown in Appendix A as plots (a), (b) and (c) of altitude effects on fuel consumption and gaseous emissions, in which the elevation above sea level to 10,000 feet comprises the x-axis and the tested for parameter comprises the y-axis. The engine developed 555 lb-ft torque at 1900 rpm and temperature was 85 deg. F. air temperature For this particular engine and operating paramters it can be seen that BSFC increased about 2% between sea level and 9000 feet. However, NOx emissions increased by about 8%. CO increased slightly from sea level to 9000 feet while hydrocarbon emissions showed a marked decrease.

EXAMPLE 2

The effect of air intake temperature on engine performance and emissions was studied using the variable altitude simulator system, the testing systems and the engine of Example 1. Intake air was cooled by passing through water cooled heat exchangers as described above in connection with FIGS. 1–3. Air intake temperatures ranged from about −2° F. and about 120° F. In these tests air pressure was maintained at 620 mmHg to simulate an altitude of 5500 feet. The engine was operated at 1900 RPM and produced 555 lb-ft of torque. The results are graphically shown in Appendix A as plots (d), (e) and (f). The x-axis comprises air temperature from −10° F. to 90° F. and the y-axis of the plot comprises the tested for parameter.

It will be seen that fuel consumption (BFSC) increased by 9% as air inlet temperature increased. Likewise NOx emissions increased by nearly 14% while CO also Increased with increasing inlet air temperature. Hydrocarbon emissions exhibited no trend as intake air temperature increased.

It should be noted that the results reported in Examples 1 and 2 are of interest in showing the effects of altitude and intake air temperature on the particular engine tested. The emission levels and engine performance will vary with different operating parameters and between different engine types.

An important feature of the system of the invention is the maintaining a balance between air intake pressure and exhaust pressure. The following examples illustrate the effects of pressure imbalance on engine fuel consumption and emissions at several different simulated altitudes.

EXAMPLE 3

The variable altitude simulator system of Example 1 was modified by the addition of butterfly valves to restrict the flow of intake air to the test engine and air to the exhaust dilution tunnel. Intake air was restricted so that the intake air pressure ranged from less than the exhaust pressure, through a point where intake and exhaust pressure were balanced. The test engine and testing system were as described in Example 1. The test engine was operated at 1550 RPM and developed 565 lb-ft torque. Barometric pressure developed by the supercharger was 543 mmHg to simulate an altitude of 9000 feet. The engine emissions (NOx, THC and CO) and engine fuel consumption (BSFC) were tested with intake air pressure to exhaust imbalance ranging from about −100 mmHg to 0 (balanced) to about +50. The results are graphically shown by plots g, h, i below in which the pressure imbalance comprises the x-axis and the measured parameters B as plots (g), (h) and (i) in which the pressure imbalance comprises the x-axis and the measured parameters comprise the y-axis.

The vertical line represents the point at which the intake air pressure and the exhaust are essentially the same or balanced.

The correct value for the measured parameter is at the balance point on the vertical line. When the same parameter is measured when the pressure imbalance is positive or negative the results obtained are skewed above or below the correct result. Thus, for example, NOx emissions can be off by about 10% when imbalance is in favor of the exhaust to about 20% when the imbalance favors the intake air. Restricting air flow to the engine without balancing the exhaust pressure can lead erroneousness results.

EXAMPLE 4

The testing procedure of Example 3 was repeated but the simulated altitude was set at sea level. The results obtained for engine performance and emissions are effected by pressure imbalance both at high and low engine loads. The results are graphically shown in Appendix B as plots (g), (h) and (i) for an engine developing 56 lb-ft torque at 1550 RPM and as plots (j), (k) and (l) for the same engine developing 56 lb-ft torque at 1550 RPM. When intake air and exhaust are not in balance the results are skewed from the results obtained for the simulated altitude when pressure is balanced.

The results show that boosting the intake air pressure without equilibrating the exhaust pressure or boosting exhaust pressure without equilibrating the intake air pressure in an attempt to simulate an altitude different from the local altitude leads to erroneous results. For the engine tested in this example the test results are generally higher when the air intake pressure is less than the exhaust pressure than when the air intake and exhaust pressures are essentially equal. Likewise the test results are lower than the equilibrated pressures when the intake air pressure is greater than the exhaust pressure.

As described herein a method and apparatus are provided for testing engines and vehicles in stationary laboratories to explore the effects of varying altitude and air temperature on performance and exhaust emissions, to develop electronic and mechanical systems, to examine product quality, and to conduct certification tests. The engines and vehicles are tested using dynamometers, with variable simulated altitude system as described herein. Emission tests are conducted in accordance with EPA regulations. Higher or lower altitudes can be simulated by controlling and equilibrating the pressure at the engine air intake and exhaust, and the test results are substantially the same as test results received when an engine is tested at the actual altitude. Accordingly, utilizing the system of the present invention, engines can be accurately tested and developed at a variety of simulated altitudes to insure that the engines and/or vehicles will achieve maximum performance and fuel efficiency while complying with EPA emissions standards.

As will be understood, various arrangements which lie within the spirit and scope of the invention other than those described in detail in the specification will occur to those persons skilled in the art. It is therefore to be understood that the invention is to be limited only by the claims appended hereto.

Having described the invention I claim:

1. In the testing of internal combustion engines and motor vehicles containing internal combustion engines, said engine defining an air intake portion comprising an engine air intake and crankcase and an exhaust, by leading the exhaust emissions from an engine to an exhaust dilution tunnel and drawing a sample of diluted exhaust for analysis to determine engine performance and engine emission components, the invention comprising:
a system for testing said engines at various altitudes and operating temperatures by balancing a selected air pressure at engine intake, crankcase and exhaust to simulate operating conditions at the altitude represented by said selected air pressure, comprising:
a. a single pressure control module for pressurizing ambient air to a selected pressure to simulate a desired altitude;
b. a pressure-temperature equalization module in fluid communication with said pressure control module for receiving pressurized air from said pressure control module, said pressure-temperature equalization module comprising a pressure tight container defining a plenum and a heat exchanger for cooling or heating said pressurized air to a desired temperature;
c. said pressure control module being in fluid communication with said air intake and crankcase of said engine and with said exhaust dilution tunnel for supplying air at said selected pressure to said engine air intake portion and said exhaust dilution tunnel;
whereby pressure at said air intake, crankcase and said exhaust dilution tunnel is or is about equilibrated and simulates operating conditions of said engine at an altitude represented by said selected pressure.

2. The system of claim 1 wherein said pressure control module comprises a motor driven supercharger, the speed of said supercharger being controllable thereby to control the pressure of the output from said supercharger.

3. The system of claim 2 wherein said supercharger is a positive displacement compressor.

4. The system of claim 2 wherein said supercharger is a centrifugal compressor.

5. The system of claim 2 wherein said controller consists of a vector line controller in electrical communication with said motor for adjusting motor speed and with a pressure sensing device at said pressure-temperature control module for adjusting motor speed in response to pressure feedback signals from said pressure sensing device.

6. The system of claim 1 wherein said pressure tight plenum is adapted to circulate incoming air from said pressure controller module through said heat exchanger.

7. The system of claim 1 wherein said pressure controller module and said pressure-temperature equalization module are provided with wheels whereby said system can be readily moved.

8. In the testing of internal combustion engines and motor vehicles including internal combustion engines, said engine defining an air intake portion comprising an engine air intake and crankcase air intake and an exhaust portion, the testing consisting of leading exhaust emissions from said engine to an exhaust dilution tunnel and thereafter drawing a sample of diluted exhaust for analysis to determine engine performance and engine emission components, a method for testing said engines at various altitudes and operating temperatures by balancing a selected air pressure at engine intake, crankcase and exhaust to simulate operating conditions at the altitude represented by said selected air pressure, said method comprising the steps of:

a. placing said air intake and said crankcase of an engine to be tested and said exhaust dilution tunnel in fluid communication with a pressure-temperature equalization module, said pressure-temperature equalization module comprising a plenum in fluid communication with a motor driven supercharger and having a heat exchanger disposed therein, said heat exchanger having lines for the ingress and egress of cooling fluid;
b. driving said supercharger to pressurize said air to a desired pressure to simulate a selected altitude at which to test said engine;
c. passing said pressurized air at said selected pressure to said plenum;
d. passing said pressurized air in said plenum through said heat exchanger to bring the temperature thereof to a desired operating temperature at which to test said engine;
e. operating said engine at a desired engine speed and load to test said engine at said desired air pressure and air temperature;
f. balancing said air pressure at said air intake and said exhaust by leading said compressed air at a selected pressure and operating temperature from said plenum to said air intake portion of said engine and to said exhaust dilution tunnel to balance said pressure at said air intake portion and at said exhaust dilution tunnel;
f. leading exhaust from said engine to said exhaust dilution tunnel to dilute said exhaust with air at said selected pressure; and
g. sampling said diluted exhaust and analyzing said sample.

9. The method of claim 8 comprising operating said engine at simulated altitudes from sea level to about 12000 feet.

10. The method of claim 8 comprising operating said engine at an air temperature of 85° F.

11. The method of claim 8 comprising testing said engine for brake specific fuel consumption (BSFC), NOx, total hydrocarbons (THC) and carbon monoxide (CO).

12. The method of claim 8 comprising operating said engine at test operating temperatures ranging from about −2° F. to about 120°F.

13. The method of claim 8 wherein the difference between intake pressure and exhaust pressure is not more than about 10 mmHg.

14. The method of claim 8 wherein the difference between intake pressure and exhaust pressure is about 6 mmHg.

15. In the testing of internal combustion engines and motor vehicles containing internal combustion engines, said engine defining an air intake portion comprising an engine air intake and crankcase and an exhaust, by leading the exhaust emissions from an engine to an exhaust dilution tunnel and drawing a sample of diluted exhaust for analysis to determine engine performance and engine emission components, the invention comprising:

a system for testing said engines at various altitudes and operating temperatures by balancing a selected air pressure at engine intake crankcase and exhaust to simulate operating conditions at the altitude represented by said selected air pressure, said system comprising:

a. a single pressure control module for pressurizing ambient air to a selected pressure to simulate a desired altitude;
b. a pressure-temperature equalization module in fluid communication with said pressure control module for receiving pressurized air from said pressure control module, said pressure-temperature equalization module comprising a pressure tight container defining a plenum and a heat exchanger for cooling or heating said pressurized air to a desired temperature and further including an air temperature controller comprising a pneumatic valve disposed in one of said heat exchanger water inlet or water outlet lines, a thermocouple disposed in an air outlet from said pressure type plenum in electrical communication with a controller device for operating said pneumatic valve responsive to feedback signals from said thermocouple;
c. said pressure control module being in fluid communication with said air intake and crankcase of said engine and with said exhaust dilution tunnel for supplying air at said selected pressure to said engine air intake portion and said exhaust dilution tunnel;
whereby pressure at said air intake and crankcase and said exhaust dilution tunnel is or is about equilibrated and simulates operating conditions of said engine at an altitude represented by said selected pressure.

* * * * *